(12) United States Patent
Park (10) Patent No.: US 7,832,873 B2
(45) Date of Patent: Nov. 16, 2010

(54) DISPLAY DEVICE, CABINET ASSEMBLY FOR THE DISPLAY DEVICE AND METHOD OF ASSEMBLING THE DISPLAY DEVICE

(75) Inventor: Jong Man Park, Daegu-si (KR)

(73) Assignee: LG Electronics Inc., Seoul (KR)

( * ) Notice: Subject to any disclaimer, the term of this patent is extended or adjusted under 35 U.S.C. 154(b) by 744 days.

(21) Appl. No.: 11/483,550

(22) Filed: Jul. 11, 2006

(65) Prior Publication Data

US 2007/0097330 A1    May 3, 2007

(30) Foreign Application Priority Data

Nov. 2, 2005    (KR) .................... 10-2005-0104425

(51) Int. Cl.
  G03B 21/22    (2006.01)
  G03B 21/14    (2006.01)
  G02F 1/1333    (2006.01)
(52) U.S. Cl. .................... 353/74; 353/79; 353/119; 349/58
(58) Field of Classification Search ............. 353/77–79, 353/119, 122, 74; 349/58; 348/794; 312/7.2
  See application file for complete search history.

(56) References Cited

U.S. PATENT DOCUMENTS

| | | | | |
|---|---|---|---|---|
| 6,339,457 | B1 * | 1/2002 | Won ............................. | 349/58 |
| 6,812,976 | B2 * | 11/2004 | Satonaka .................... | 349/58 |
| 2001/0003471 | A1 * | 6/2001 | Lee et al. ..................... | 349/58 |
| 2001/0012087 | A1 * | 8/2001 | Sasuga et al. ............... | 349/149 |
| 2001/0036057 | A1 * | 11/2001 | Fukuyoshi ................... | 361/681 |
| 2002/0054249 | A1 * | 5/2002 | Ryu et al. .................... | 349/58 |
| 2002/0080297 | A1 * | 6/2002 | Sung ........................... | 349/58 |
| 2002/0130954 | A1 * | 9/2002 | Kim et al. ................... | 348/184 |
| 2003/0103170 | A1 * | 6/2003 | Nagata et al. .............. | 348/794 |
| 2003/0112379 | A1 * | 6/2003 | Jung ........................... | 348/789 |
| 2003/0122994 | A1 | 7/2003 | Chen et al. .................. | 349/58 |
| 2003/0160908 | A1 | 8/2003 | Peng ........................... | 349/58 |
| 2004/0090560 | A1 * | 5/2004 | Jang ........................... | 348/836 |
| 2005/0151451 | A1 | 7/2005 | Chen et al. .................. | 312/7.2 |

FOREIGN PATENT DOCUMENTS

| | | |
|---|---|---|
| CN | 1510474 | 7/2004 |
| CN | 2727785 | 9/2005 |
| JP | 2000-034411 | 2/2000 |
| JP | 2003-050549 | 2/2003 |
| JP | 2003-114623 | 4/2003 |
| JP | 2005-031641 | 2/2005 |

OTHER PUBLICATIONS

Japanese Office Action dated Dec. 4, 2006.
European Search Report dated Nov. 24, 2006.
Chinese Office Action.
Chinese Office Action dated Apr. 17, 2009 and English language translation.

* cited by examiner

*Primary Examiner*—Georgia Y Epps
*Assistant Examiner*—Jori S Reilly-Diakun
(74) *Attorney, Agent, or Firm*—KED & Associates, LLP (57) ABSTRACT

A display device includes a display module, a rear cabinet supporting a rear portion of the display module, and a front cabinet having at least two frames provided on edges of the display module to protect a front portion of the display module.

17 Claims, 10 Drawing Sheets

DISPLAY DEVICE, CABINET ASSEMBLY FOR THE DISPLAY DEVICE AND METHOD OF ASSEMBLING THE DISPLAY DEVICE

BACKGROUND OF THE INVENTION

1. Field of the Invention

The present invention relates to a cabinet assembly of a display device, and more particularly, to a cabinet assembly that can be improved in an assembling structure and an appearance and manufactured with low cost, a display device having the cabinet assembly, and a method of assembling the display device.

2. Description of the Related Art

Generally, a liquid crystal display monitor and television are protected from an external impact by being enclosed by a cabinet assembly.

The cabinet assembly includes a front cabinet arranged on edges of a display module and a rear cabinet protecting a rear portion of the display module and coupled to the front cabinet.

The front cabinet is generated formed in a single body. That is, the front cabinet includes a front portion provided with an opening corresponding to an effective screen region of the display module and four side portions extending rearward from an outer circumference of the front portion to enclose side edges of the display module.

The front cabinet is coupled to the display module using coupling members such as screws.

When the display module is coupled to a rear surface of the front cabinet, since the coupling portion to which the coupling members will be coupled must be formed on the rear surface of the front cabinet, the width of the front cabinet increases, thereby making it difficult to develop a display device having a slim design.

In addition, in a state where the display module is coupled to the front cabinet, a posture of the display module must be changed, for example, be turned upside down, for the additional assembling processes, in the course of which the display module may be damaged or scratched. Furthermore, the posture change of the heavy display module is troublesome for a worker.

Furthermore, when the display module is fixed on the front cabinet, the structure of the front cabinet is complicated and thus it is difficult to cast the front cabinet. This causes the increase of the casting cost of the front cabinet.

In addition, the front cabinet partly defines an outer appearance of the display device. However, since the front cabinet is formed in a single body, it is designed with a single color, not fulfilling a variety of tastes of the consumers.

SUMMARY OF THE INVENTION

Accordingly, the present invention is directed to a cabinet assembly for a display device that substantially obviates one or more problems due to limitations and disadvantages of the related art.

An object of the present invention is to provide a display device that can be designed in a slim structure.

Another object of the present invention is to provide a display device that can be formed in a simple structure, thereby reducing manufacturing cost.

Still another object of the present invention is to provide a display device having a cabinet assembly formed with a variety of colors.

Still another object of the present invention is to provide a display device that can be manufactured through a simple assembling process in the course of which damage of a display module can be prevented.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a display device including: a display module; a rear cabinet supporting a rear portion of the display module; and a front cabinet having at least two frames provided on edges of the display module to protect a front portion of the display module.

In another aspect of the present invention, there is provided a cabinet assembly for a display device, including: a rear cabinet for receiving a display module; and a front cabinet supporting a front portion of the display module and coupled to the rear cabinet, wherein the front cabinet includes a plurality of frames each having a front portion for protecting a front surface of the display module and a supporting portion extending rearward from the front portion and inserted between the display module and the rear cabinet.

In still another aspect of the present invention, there is provided a display device including: a display module; a rear cabinet supporting a rear portion of the display module; and a front cabinet divided into a plurality of frames provided on side edges of the display module.

In still yet another aspect of the present invention, there is provided a method of assembling a display device, including: placing a display module in a rear cabinet; and fixing a front cabinet toward a front surface of the display module.

In still yet another aspect of the present invention, there is provided a method of assembling a display device, including: inserting a display module in a rear cabinet; and placing a front cabinet on a front surface of the display module while allowing the front cabinet to be hooked on the rear cabinet without using any separate fixing members.

According to the present invention, the cabinet assembly of the display device can be formed in a slim design and a simple structure.

Furthermore, since the frames can be formed with a different color, the outer appearance of the display device can be improved.

The assembling process of the display device is simplified and thus the damage of the display module can be prevented during the assembling process.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
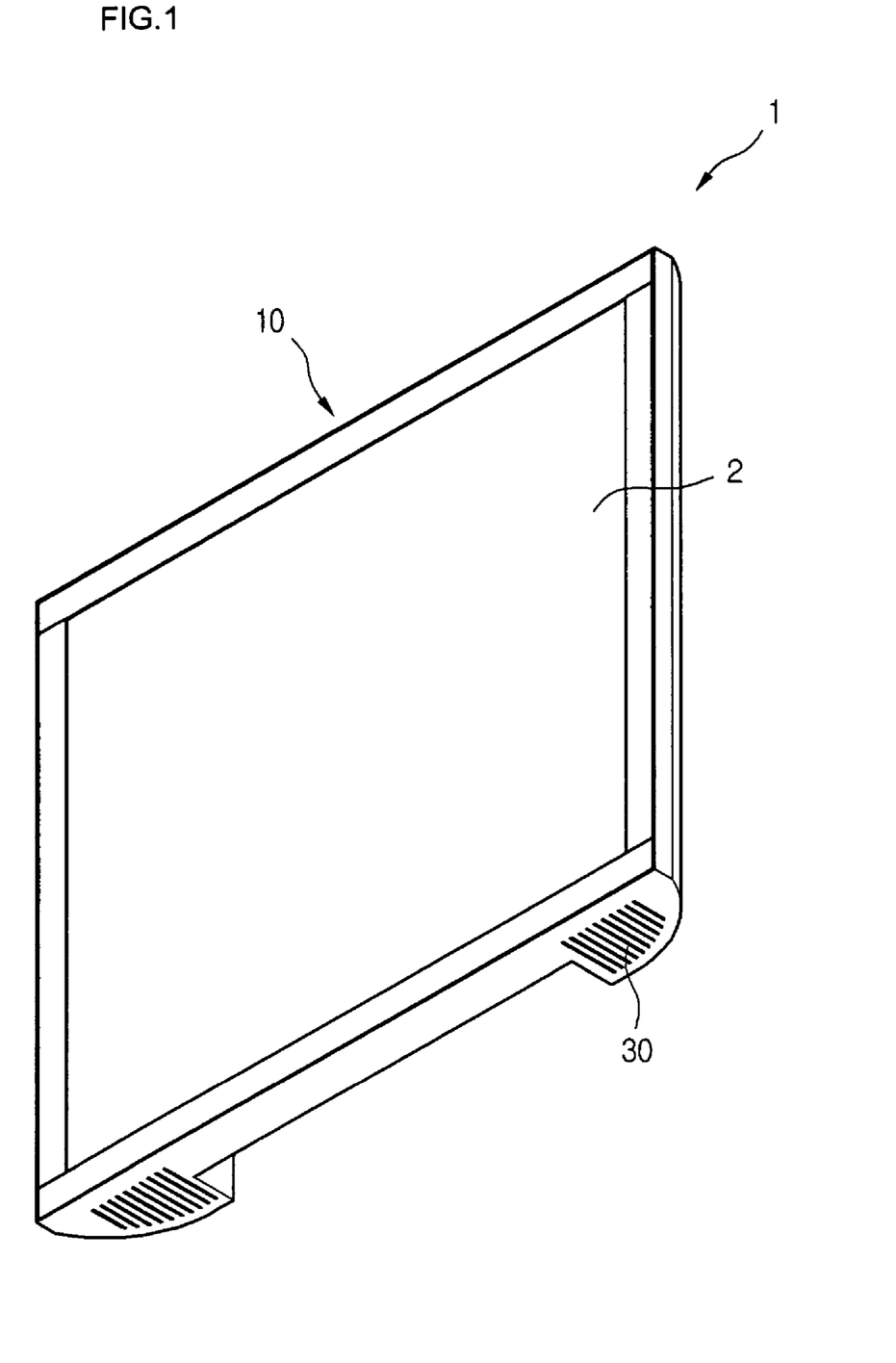
FIG. 1 is a perspective view of a cabinet assembly of a display device according to an embodiment of the present invention.
Figure 2:
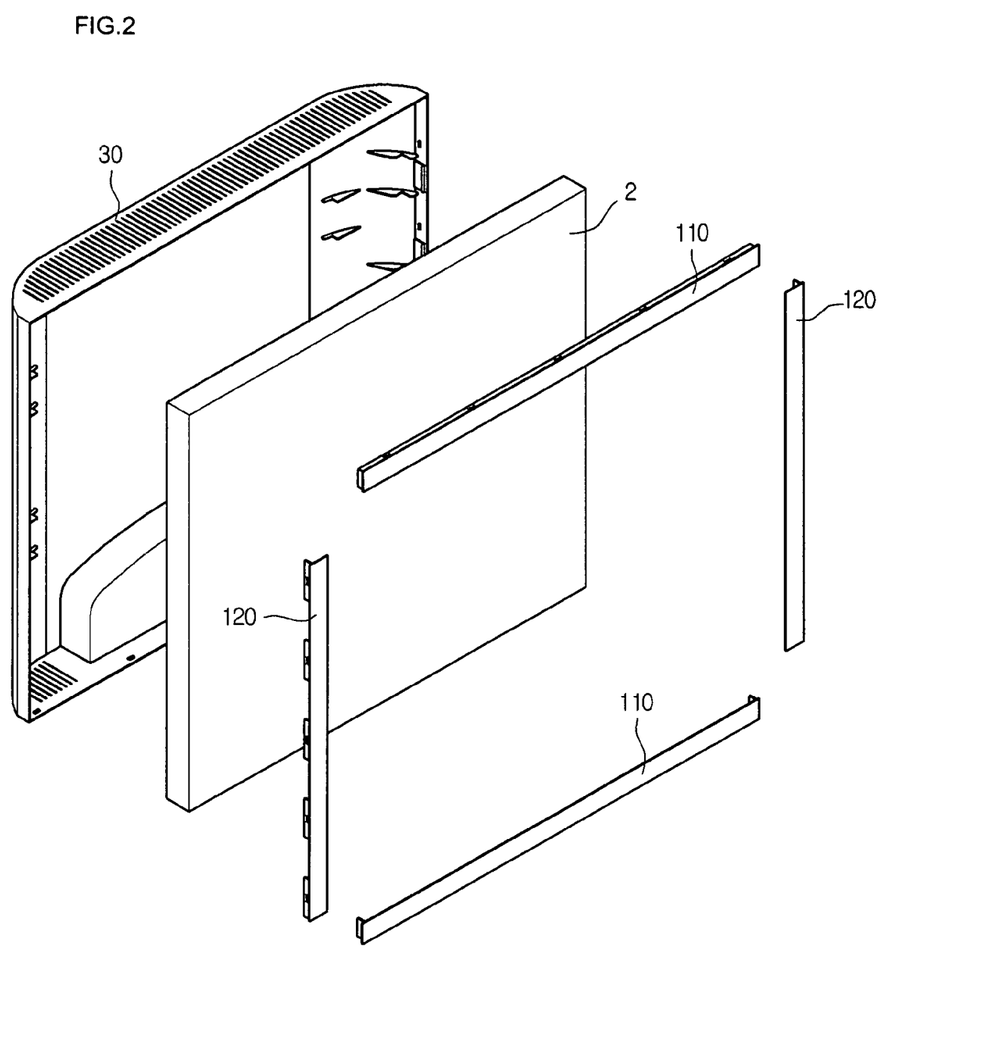
FIG. 2 is an exploded perspective view of the cabinet assembly of FIG. 2.

FIG. 1 is a perspective view of a cabinet assembly of a display device according to an embodiment of the present invention and FIG. 2 is an exploded perspective view of the cabinet assembly of FIG. 2.

Although a circuit unit including a printed circuit board and a variety of electric parts are actually disposed inside the rear cabinet, they are omitted in the drawing for the descriptive convenience.

Referring to FIGS. 1 and 2, a cabinet assembly 1 of this embodiment includes a front cabinet 10 being disjoined to 4 components and disposed in front of a display module 2 and a rear cabinet 30 disposed in rear of the display module 2 and coupled to the front cabinet 10.

The front cabinet 10 includes two horizontal frames 110 for protecting upper and lower edges of a front surface of the display module 2 and two vertical frames 120 for protecting left and right edges of the front surface of the display module 2.

An assembling process of the cabinet assembly 10 will now be described with reference to FIG. 2.

The display module 2 is first fixed inside the rear cabinet 30. In order to protect the display module 2, the display module 2 is preferably inserted into the rear cabinet 30 in a state where the rear cabinet 30 lays on a surface. Here, when the display module 2 is inserted into the rear cabinet 30, gaps are defined between the display module 2 and the rear cabinet 30.

The gaps defined between the display module 2 and the rear cabinet 30, are filled with the horizontal and vertical frames 110 and 120 of the front cabinet 10.

That is, in a state where the display module 2 is fixed inside the rear cabinet 30, the horizontal frames 110 are fitted in the upper and lower gaps between the display module 2 and the rear cabinet 30. Then, the vertical frames 110 are fitted in the left and right gaps between the display module 2 and the rear cabinet 30.

By filling the gaps with the horizontal and vertical frames 110 and 120, the movement of the display module 2 can be prevented and thus the display module 2 can be stably protected.

The fixing structure of the display module 2 to the rear cabinet 30 and the fixing structure of the front cabinet 10 to the rear cabinet 30 can be realized by a latch structure. Therefore, by simply inserting the display module 2 into the rear cabinet 30 and by simply inserting the horizontal and vertical frames 110 and 120 into the gaps between the display module 2 and the rear cabinet 30, the display module 2 and the front cabinet 10 can be stably fixed to the rear cabinet 30. Therefore, there is no need for a separated fixing member, furthermore the manufacturing process can be simplified.

The front and rear cabinets 10 and 30 will now be described in more detail.

Figure 3:
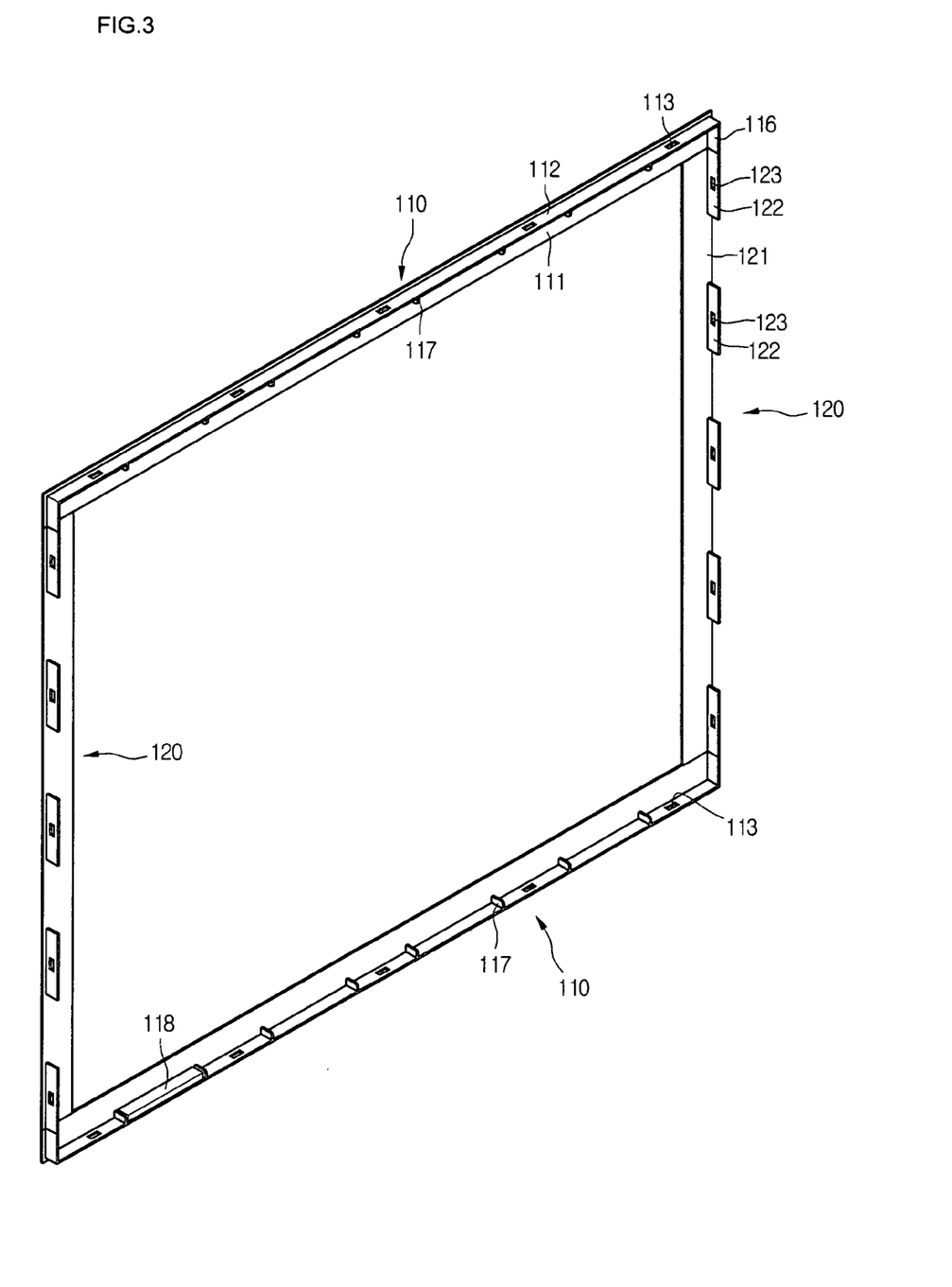
FIG. 3 is a perspective view of a front cabinet depicted in FIG. 2.

FIG. 3 is a perspective view of a front cabinet depicted in FIG. 2.

Referring to FIG. 3, the horizontal frames 110 faces each other and the vertical frames 110 also faces each other and connects opposite ends of the upper horizontal frame 110 to opposite ends of the lower horizontal frame 110.

Each of the horizontal frames 110 includes a front portion 111 protecting corresponding one of the upper and lower edges of the front surface of the display module and a supporting portion 112 extending rearward from the front portion 111 and fixed on an inner surface of the rear cabinet 30.

A plurality of slots 113 are formed on the supporting portion 112. The slots 113 are associated with cabinet fixing projections (50 of FIG. 4) when the horizontal frames 110 are inserted toward the rear cabinet 30 so that the horizontal frames 120 can be fixed on the rear cabinet 30.

The supporting portions 112 are preferably formed inward the outermost ends of the front portions 111 such that, when the horizontal frames 110 are fixed to the rear cabinet 30, the horizontal frames 110 cover the horizontal upper and lower ends of the rear cabinet 30 to eliminate parting lines. Furthermore, when the user intends to replace the horizontal frames 110, the user can easily separate the horizontal frames 110 by pulling the outermost ends of the horizontal frames 110.

A plurality of supporting bosses 117 for securely supporting the supporting portions 112 to the front portions 111 are preferably formed on inner surfaces of the supporting portions 112.

Side supporting portions 116 are formed on opposite ends of the supporting portion 112. The side supporting portions 116 and the supporting portions 112 function to protect corners of the display module 2 fixed inside the rear cabinet 30.

A controller installing portion 118 for receiving a controller of the display device may be formed on the lower horizontal frame 110.

The vertical frames 120 include front portions 121 disposed on left and right edges of the front surface of the display module 2 and supporting portions 122 extending rearward from the front portions 121 and fixed on the inner surface of the rear cabinet 30.

Each of the supporting portions 112 is divided into a plurality of sections so that a display module supporting portion (410 of FIG. 4) can be placed between the sections of the supporting portion 112. This will be described in more detail later.

A plurality of slots 123 similar to the slots 113 of the supporting portion 112 of the horizontal frame 110 are formed on the supporting portions 122. The supporting portions 122 are formed inward the outermost ends of the front portions 121 such that, when the vertical frames 120 are fixed to the rear cabinet 30, the vertical frames 120 cover the vertical left and right ends of the rear cabinet 30 to eliminate parting lines. When the user intends to replace the vertical frames 120, the user can easily separate the vertical frames 120 by pulling the outermost ends of the vertical frames 110.

The horizontal and vertical frames 110 and 120 are fixed to the rear cabinet 30 and can be separated from each other. Since the four frames 110 and 120 can be individually separated, it is convenient to handle them.

Figure 4:
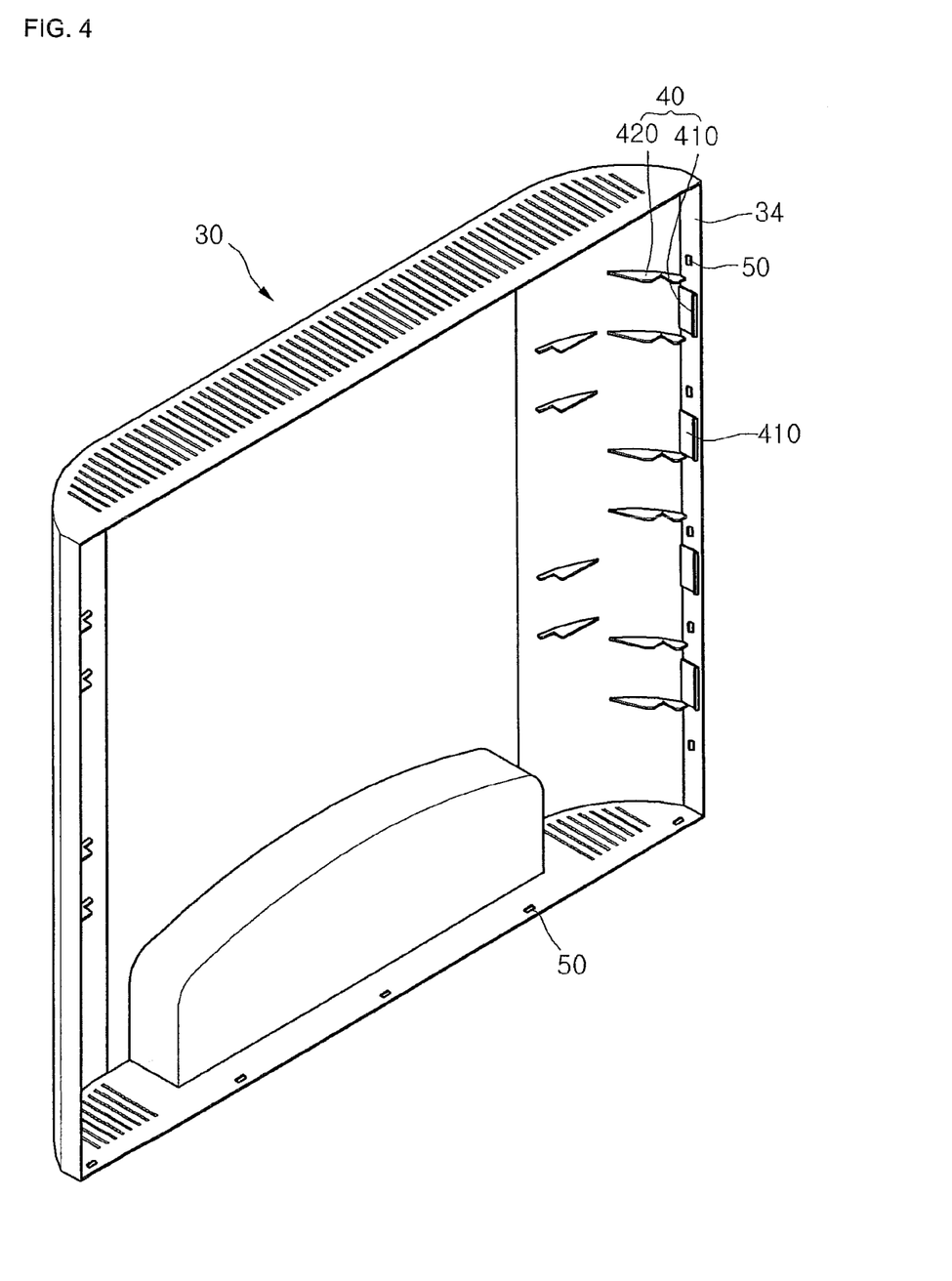
FIG. 4 is a perspective view of the rear cabinet depicted in FIG. 2.
Figure 5:
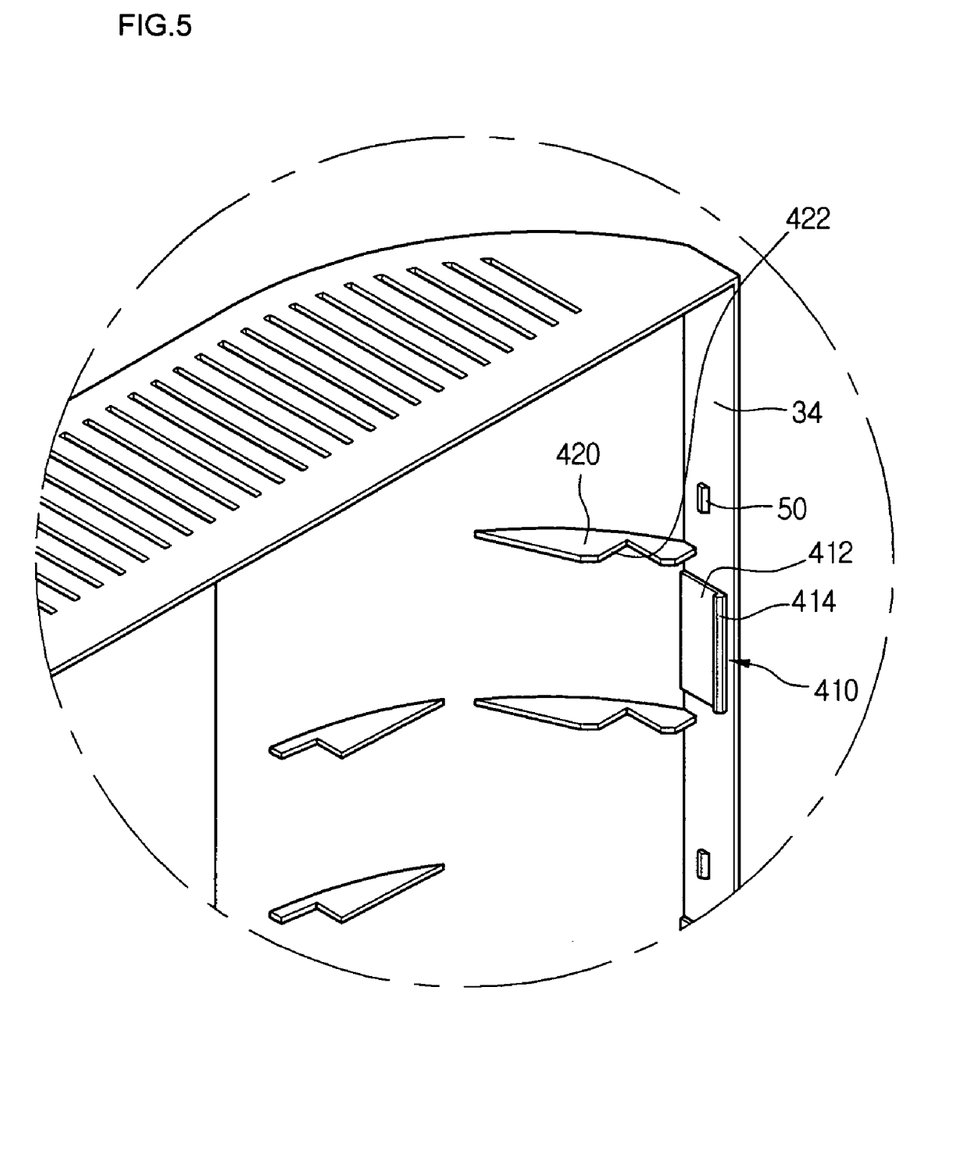
FIG. 5 is an enlarged view of an upper corner portion of the rear cabinet depicted in FIG. 4.

FIG. 4 is a perspective view of the rear cabinet and FIG. 5 is an enlarged view of an upper corner portion of the rear cabinet.

Referring to FIG. 4, the rear cabinet 30 includes a plurality of display module fixing portions 40 for fixing the display module 2 and a plurality of front cabinet fixing portions 50 for fixing the front cabinet 10.

The display module fixing portion 40 includes a display module supporting portion 410 supporting the side portions of the display module 2 and a display module supporting boss 420 supporting a rear edge of the display module 2. The display module supporting portions 410 are left and right inner surfaces of the rear cabinet 30.

Referring to FIG. 5, the display module supporting portion 410 includes a supporting surface 412 contacting a side surface of the display module 2 and a hook step 414 extending inward from a front portion of the supporting surface 412.

The display module supporting portions 410 are preferably spaced apart from each other in a vertical direction. When the vertical frame 120 of the front cabinet 10 is associated with the rear cabinet 30, the sections of the supporting portion 122 of the vertical frame 120 are interposed between the display module supporting portions 410.

That is, the display module supporting portions 410 and the sections of the supporting portion 122 of the vertical frame 120 are alternately arranged on an identical plan. That is, when the display module 2 is inserted in the rear cabinet 30, gaps are defined between the display module 2 and the rear cabinet 30 by the module supporting portions 410. The sections of the supporting portions 122 of the vertical frames 120 are securely fitted in the gaps, thereby securely coupling the front cabinet 10 to the rear cabinet 30. At this point, by fitting the sections of the supporting portions 122 of the vertical frames 120, the display module 2 is also securely supported.

The display module supporting bosses 420 are formed on left and right inner curved surfaces of the rear cabinet 30. A front end 422 of the display module supporting boss 420 is formed to be in parallel to a rear surface of the display module 2 to supportably contact the rear surface of the display module 2.

Figure 6:
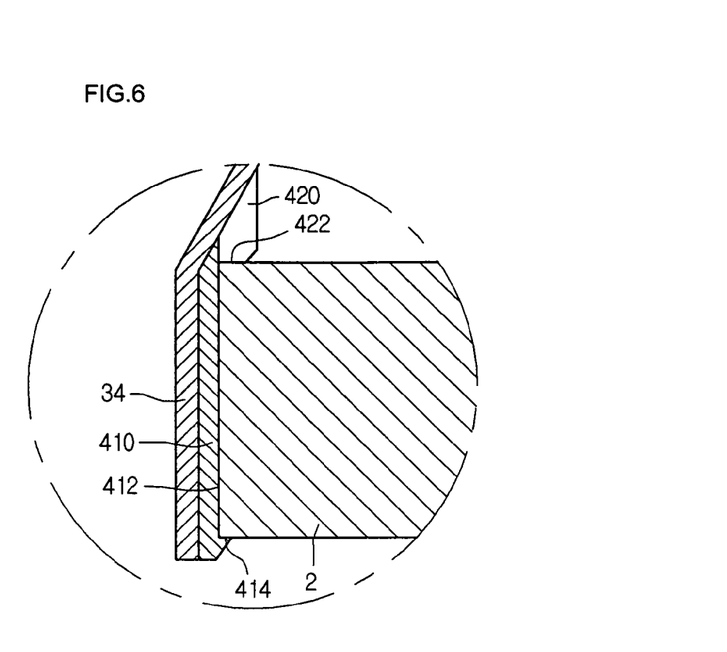
FIG. 6 is a sectional view of a state where a display module is coupled to a rear cabinet according to the embodiment of the present invention.

FIG. 6 is a sectional view of a state where the display module is coupled to the rear cabinet.

Referring to FIG. 6, the side surfaces of the display module 2 are supported by the display module supporting portions 410 formed on the left and right inner surfaces of the rear cabinet 30. The rear surface of the display module 2 is supported by the module supporting bosses 420 formed on the inner surface of the rear cabinet 30. A front surface of the display module 2 is supported by the hook steps 414 formed on the front portions of the display module supporting portions 410.

The display module supporting portion 410 may be separately prepared and attached on the rear cabinet 30. Alternatively, the display module supporting portion 410 may be integrally formed with the rear cabinet 30 through injection molding.

After the display module 2 is mounted inside the rear cabinet 30, the horizontal and vertical frames 110 and 120 of the front cabinet are fitted between the display module 2 and the rear cabinet 30, thereby more securely supporting the display module 2 in the cabinet assembly 1. The display module 2 may be stably suspended in a space defined by the front and rear cabinets 10 and 30.

Figure 7:
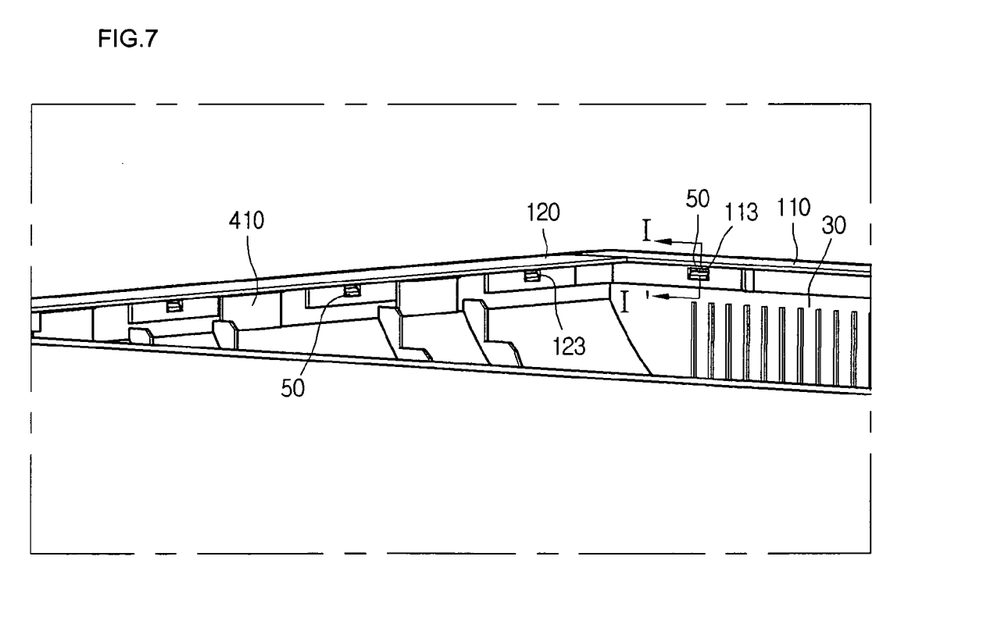
FIG. 7 is a perspective view of a state where horizontal and vertical frames of a front cabinet are coupled to a rear cabinet according to the embodiment of the present invention.
Figure 8:
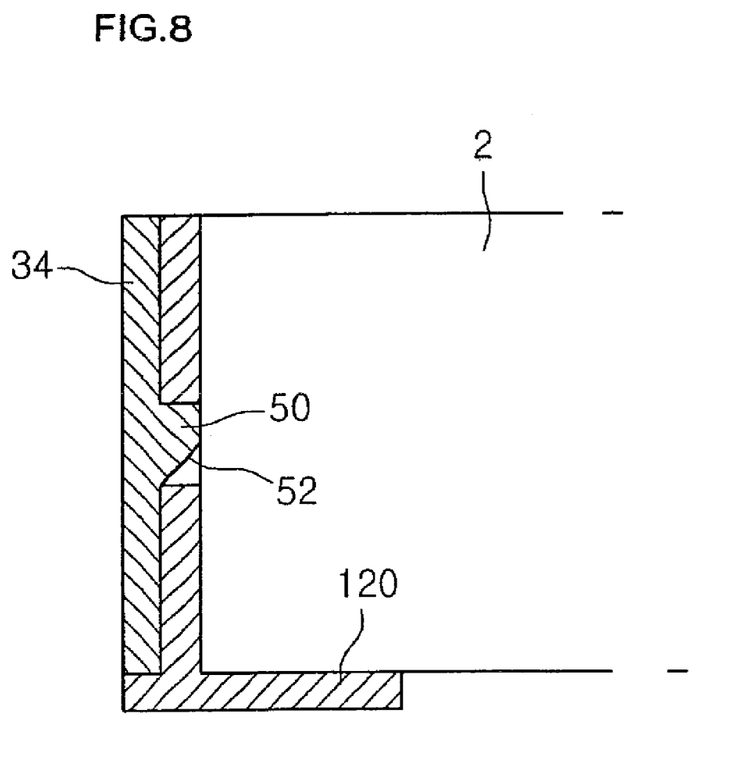
FIG. 8 is a sectional view taken along line I-I of FIG. 7.

FIG. 7 is a perspective view of a state where the horizontal and vertical frames of the front cabinet are coupled to the rear cabinet. Here, the display module is omitted for the descriptive convenience. FIG. 8 is a sectional view taken along line I-I' of FIG. 7. For the description, there is shown the display module in FIG. 8.

Referring to FIGS. 7 and 8, the horizontal and vertical frames 110 and 120 of the front cabinet 10 are coupled to the rear cabinet 30 as the slots 113 and 123 are hooked with the front cabinet fixing projections 50. Since the front cabinet 10 and the rear cabinet 30 are coupled to each other through a simple hooking operation, the assembling process is more convenient. Additional fixing members such as screws can be used, however this is troublesome for the worker.

That is, when the horizontal and vertical frames 112 and 122 are inserted into the rear cabinet 30, the slots 113 and 123 formed on the horizontal and vertical frames 112 and 122 are hooked with the front cabinet fixing projections 50.

Since the coupling process of the horizontal frames 110 is identical to that of the vertical frames 120, the description will be done for the vertical frames 120.

As described above, after the display module 2 is fixed in the rear cabinet 30, the vertical frames 120 are coupled to the rear cabinet 30.

At this point, the size of the display module 2 is less than an inner size of the rear cabinet 30 so that the display module 2 can be received in the rear cabinet 30.

Therefore, when the display module 2 is coupled to the rear cabinet 30, the gaps are defined between the display module 2 and the rear cabinet 30.

The sections of the supporting portions 122 of the vertical frames 120 are inserted through the gaps such that the slots 123 formed on the sections of the supporting portions 112 of the vertical frame 120 are hooked with the front cabinet fixing projections 50 of the rear cabinet 30.

At this point, an inclined surface 52 is formed on a front portion of the front cabinet fixing projection 50 so that the supporting portions 122 can be more smoothly inserted.

As described above, when the supporting portions 122 of the vertical frames 120 are fixedly inserted between the gaps defined between the display module 2 and the rear cabinet 30, as shown in FIG. 8, the supporting portions 122 of the vertical frames 120 and the side portions 34 of the rear cabinet 30 are to be disposed adjacent to the side surfaces of the display module 2.

Therefore, the inner and outer surfaces of the supporting portions 122 of the vertical frames 120 contact the side surface of the display module 2 and the inner surface of the rear cabinet 30, respectively.

Therefore, the display module 2 is primarily fixed by the rear cabinet 30 and secondarily further fixed by the vertical frames 120 fixed on the rear cabinet 30. The horizontal frames 110 are identically fixed with the vertical frames 120.

As described above, since the supporting portions 112 and 122 of the front cabinet 10 and the side portions of the rear cabinet 30 are disposed on the side portions of the display module, the horizontal width of the front cabinet 10 can be only slightly greater than the display module. Therefore, the front cabinet 10 of this embodiment can be designed to be less than the related art front cabinet 10.

Figure 9:
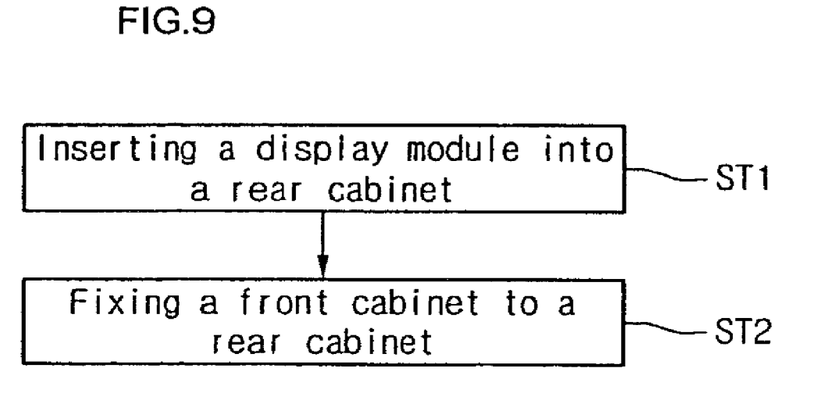
FIG. 9 is a flowchart of a method of manufacturing the cabinet of the display device.

FIG. 9 is a flowchart of a method of manufacturing the cabinet of the display device.

Referring to FIG. 9, the display module 2 is inserted into the rear cabinet 30 in a state where the front surface of the rear cabinet 30 is oriented upward (ST1).

That is, the location of the display module 2 is primarily supported by the display module supporting portion 410 and the display module supporting bosses 420 of the rear cabinet 30. At this point, since the display module 2 is inserted downward, the possibility of screen damage such as scratch can be relatively low. In addition, the downward insertion of the display module is very convenient for a worker.

The display module 2 can be in a state where the display module 2 consecutively has coupled to a mainframe panel and a metal shield already. The metal shield may be omitted.

After the display module 2 is fixed in the rear cabinet 30, the front cabinet 10 is installed to more securely support the display module 2 and protect the front surface of the display module (ST 2). The installation of the front cabinet 10 is performed by fixing the front cabinet 10 to the rear cabinet 30.

That is, the installation of the front cabinet 10 is performed at a location and posture identical to when the display module 2 is inserted in the rear cabinet 30. That is, the horizontal and vertical frames 110 and 120 of the front cabinet 10 are pressed downward to be inserted into the rear cabinet 30. At this point, the horizontal and vertical frames 110 and 120 are fitted into the gaps defined between the rear cabinet 30 and the display module 2, thereby more securely supporting the display module 2.

As described above, since the front cabinet 10 is divided into four sections (horizontal and vertical frames 110 and 120), the replacement of them can be more conveniently performed and thus the maintenance cost can be reduced.

According to the present invention, since there is no need to provide a separate fixing unit for fixing the display module, the structure of the cabinet can be simplified.

FIGS. 10 through 14 are views of a variety of modified examples of the front cabinet.

Figure 10:
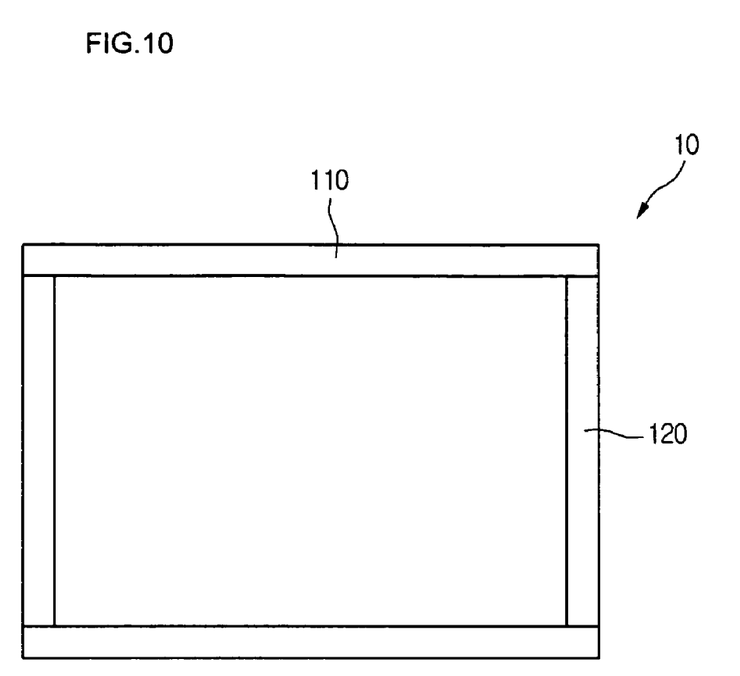
FIGS. 10 through 14 are views of a variety of modified examples of a front cabinet of the cabinet assembly according to the embodiment of the present invention.

Referring first to FIG. 10, the front cabinet is identical to that of the foregoing embodiment. That is, the front cabinet includes horizontal frames 110 and vertical frames 120 disposed between the horizontal frames 120.

Figure 11:
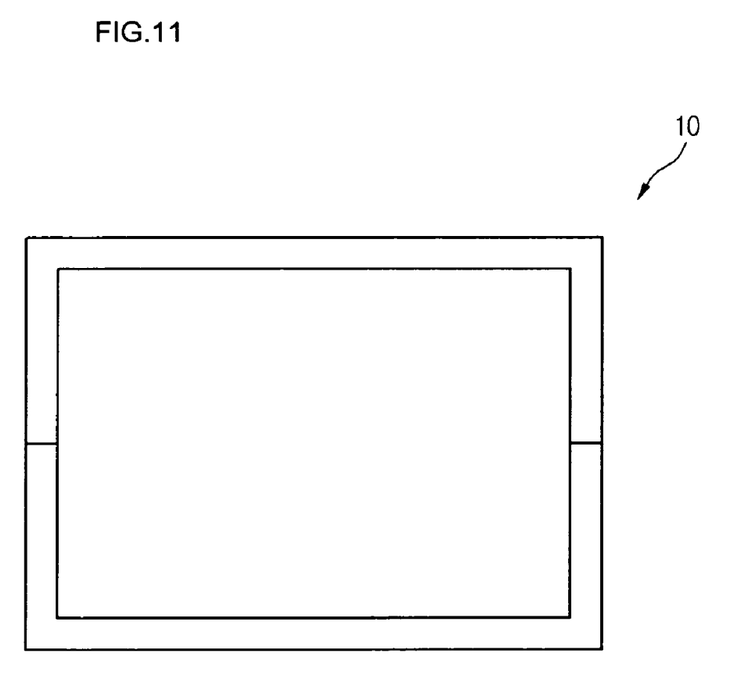

Referring to FIG. 11, the front cabinet 10 includes two frames that are divided at the position of the vertical edges of the display module.

Figure 12:
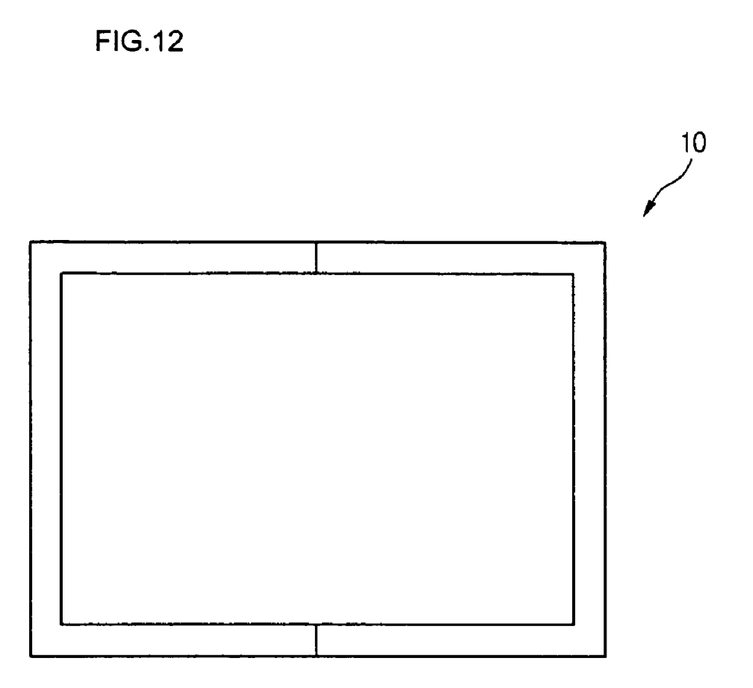

Referring to FIG. 12, the front cabinet 10 includes two frames that are divided at the position of the horizontal edges of the display module.

Figure 13:
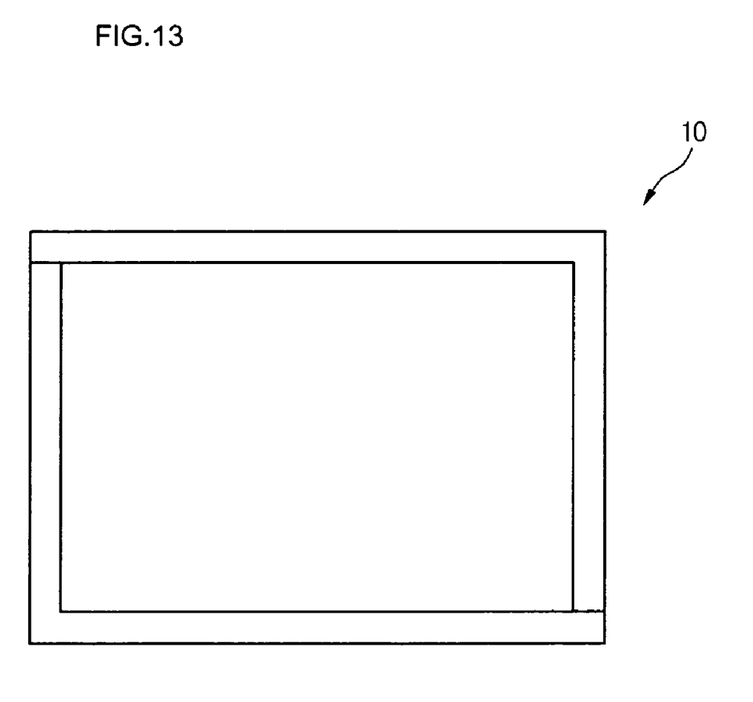

Referring to FIG. 13, the front cabinet 10 includes two frames that are divided at the diagonal corners facing each other of the display module.

Figure 14:
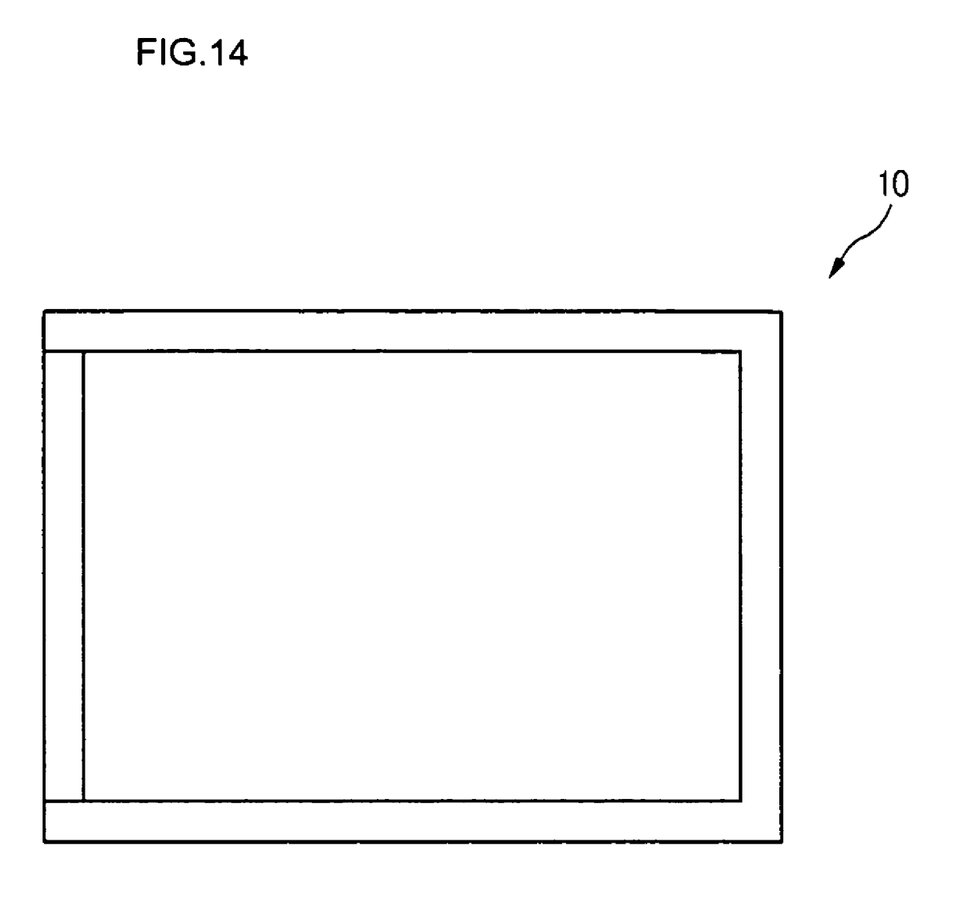

Referring to FIG. 14, the front cabinet 10 includes two frames that are divided at corners at one side of the display module.

The present invention is not limited to the above-modified examples. For example, the front cabinet may be divided into three frames.

As described above, since the front cabinet is formed of several separated frames, the separated frames may be different in a color from each other. Therefore, the display device can be designed with a variety of colors. For example, the horizontal frames may be colored with green while the vertical frames may be colored with yellow.

With the above-described cabinet structure, the horizontal width of the display device can be reduced.

Furthermore, since the frames of the front cabinet can be colored with different colors, the appearance of the display device can be improved.

In addition, since the assembling process of the display device is simplified, the worker can easily assembly the display device while preventing the display module from being damaged or scratched. That is, since the front and rear cabinets are assembly through a simple hooking operation without using any separated members, the assembling process is simplified.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A display device comprising:
   a display module;
   a rear cabinet supporting a rear portion of the display module; and
   a front cabinet having at least two frames provided on edges of the display module to protect a front portion of the display module, and the front cabinet is hooked to the rear cabinet,
   wherein the rear cabinet includes a display module fixing portion provided at an inner surface of the rear cabinet for hooking the display module thereon,
   wherein the display module fixing portion comprises:
      a supporting boss supporting a rear of the display module, and formed on the inner surface of the rear cabinet, and
      a display module supporting portion supporting a side edge portion of the display module,
   wherein the display module supporting portion comprises:
      a supporting surface contacting a side surface of the display module, and
      a hook step extending inward from a front portion of the supporting surface and at least a portion of a front surface of the display module is supported by the hook step.

2. The display device according to claim 1, wherein at least one of the frames of the front cabinet is coupled to the rear cabinet.

3. The display device according to claim 1, wherein a number of the frames is identical to a number of sides of the display module.

4. The display device according to claim 1, wherein the frames include:
   a pair of horizontal frames for protecting upper and lower horizontal edges of the display module; and
   a pair of vertical frames for protecting left and right vertical edges of the display module.

5. The display device according to claim 1, wherein at least one of the frames includes:
   a front portion disposed over a front surface of the display module to protect the front surface of the display module; and
   a supporting portion extending rearward from the front portion and coupled to the rear cabinet.

6. The display device according to claim 5, wherein the supporting portion extends from an inward portion from an end of the front portion.

7. The display device according to claim 1, wherein the frames are different in a color from each other.

8. A cabinet assembly for a display device, comprising:
   a rear cabinet for receiving a display module; and
   a front cabinet configured to support a front portion of the display module and coupled to the rear cabinet, and wherein the front cabinet is hooked to the rear cabinet, wherein the front cabinet includes a plurality of front frames, wherein at least one of the front frames has a front portion for protecting a front surface of the display module and a supporting portion extending rearward from the front portion and inserted between the display module and the rear cabinet, wherein the rear cabinet includes a display module fixing portion provided at an inner surface of the rear cabinet for hooking the display module thereon, wherein the display module fixing portion comprises:
  a supporting boss supporting a rear of the display module, and formed on the inner surface of the rear cabinet, and
  a display module supporting portion supporting a side edge portion of the display module, wherein the display module supporting portion comprises:
  a supporting surface contacting a side surface of the display module, and
  a hook step extending inward from a front portion of the supporting surface and at least a portion of a front surface of the display module is supported by the hook step.

9. The cabinet assembly according to claim 8, wherein the frames are installed at respective sides of the display module.

10. The cabinet assembly according to claim 8, wherein the rear cabinet includes the display module supporting portion for supporting and fixing the display module.

11. The cabinet assembly according to claim 8, wherein at least one of the front frames and the rear cabinet are coupled to each other by a hooking operation.

12. The display device according to claim 1, wherein the front cabinet is divided at sides or corners of the display module.

13. A method of assembling a display device, comprising:
  hooking a display module to a display module fixing portion formed on an inner surface of a rear cabinet such that the display module is fixed to the rear cabinet, wherein the display module fixing portion includes a display module supporting boss and a display module supporting portion; and
  placing a front cabinet downwardly toward the display module, and hooking a supporting portion formed on the front cabinet to a projection formed on the inner surface of the rear cabinet such that the front cabinet is fixed to the rear cabinet, wherein hooking the display module to the display module fixing portion comprises:
  placing a side edge portion of the display module on the display module supporting portion that is provided at an inner surface of the rear cabinet,
  placing a rear of the display module on a supporting boss that is provided at the inner surface of the rear cabinet,
  placing a side surface of the display module against a supporting surface of the display module supporting portion, and
  hooking a front surface of the display module with a hook step of the display module supporting portion of the rear cabinet.

14. The method according to claim 13, wherein the front cabinet is divided into a plurality of frames.

15. The method according to claim 13, wherein placing the front cabinet and the display module to the rear cabinet are allowed without using any separate fixing members.

16. The display device according to claim 1, wherein the display module supporting portion includes a plurality of display supporting portions, and the plurality of the display supporting portions are spaced apart from each other such that a supporting portion, which is hooked with a front cabinet fixing projection formed on an inner surface of the rear cabinet, of the front cabinet is interposed between the display module supporting portions, and the supporting portion is configured to extend rearward from the front cabinet.

17. The display device according to claim 5, wherein the rear cabinet further includes a side portion hooked with the supporting portion, wherein the side portion is configured to extend in a direction with respect to an extension direction of the supporting portion.

* * * * *